US011653185B2

(12) United States Patent
Shaw et al.

(10) Patent No.: US 11,653,185 B2
(45) Date of Patent: *May 16, 2023

(54) METHOD AND APPARATUS FOR DELIVERY OF APPLICATION SERVICES

(71) Applicant: AT&T Intellectual Property I, L.P., Atlanta, GA (US)

(72) Inventors: Venson Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,596

(22) Filed: Jun. 2, 2022

(65) Prior Publication Data

US 2022/0295243 A1 Sep. 15, 2022

Related U.S. Application Data

(63) Continuation of application No. 17/142,858, filed on Jan. 6, 2021, now Pat. No. 11,381,939, which is a
(Continued)

(51) Int. Cl.
*H04N 21/61* (2011.01)
*H04N 21/81* (2011.01)
(Continued)

(52) U.S. Cl.
CPC ............. *H04W 4/20* (2013.01); *H04L 65/61* (2022.05); *H04N 21/25841* (2013.01);
(Continued)

(58) Field of Classification Search
CPC ......... H04W 4/20; H04W 4/02; H04W 4/029; H04W 76/12; H04W 48/16; H04W 4/50;
(Continued)

(56) References Cited

U.S. PATENT DOCUMENTS 7,283,823 B2  10/2007  Pearce et al.
7,634,269 B2  12/2009  Gallagher
(Continued)

OTHER PUBLICATIONS

Woyke, , "Automatic Wi-Fi Offloading Coming To U.S. Carriers", Forbes, Apr. 22, 2011, Downloaded from the Internet on Jul. 10, 2012, from http://www.forbes.com/sites/elizabethwoyke/2011/04/22/automatic-wi-fi-offloading-coming-tou-s-carriers/2/.
(Continued)

*Primary Examiner* — Alazar Tilahun
(74) *Attorney, Agent, or Firm* — Guntin & Gust, PLC; Jay Anderson

(57) ABSTRACT

Systems and processes that incorporate teachings of the subject disclosure may include, for example, receiving a request for a streaming video application service from a mobile device and, responsive to determining a relationship between a service provider of a wireless access point and a service provider of a cellular network providing the streaming video application service via the cellular services. Responsive to determining that the wireless access point is in a communication range of the mobile device based on a proximity of the wireless access point to the mobile device, a communication session is initiated between the mobile device and the wireless access point. Delivery of the streaming video application service to the mobile device is switched from over the cellular network to over the wireless access point. Other embodiments are disclosed.

20 Claims, 8 Drawing Sheets

Related U.S. Application Data continuation of application No. 16/417,199, filed on May 20, 2019, now Pat. No. 10,924,899, which is a continuation of application No. 15/398,403, filed on Jan. 4, 2017, now Pat. No. 10,341,827, which is a continuation of application No. 13/571,464, filed on Aug. 10, 2012, now Pat. No. 9,571,868.

(51) Int. Cl.

| | | |
|---|---|---|
| *H04N 21/258* | (2011.01) | |
| *H04W 4/20* | (2018.01) | |
| *H04W 4/50* | (2018.01) | |
| *H04W 4/029* | (2018.01) | |
| *H04W 52/02* | (2009.01) | |
| *H04W 48/18* | (2009.01) | |
| *H04L 65/61* | (2022.01) | |
| *H04W 76/12* | (2018.01) | |
| *H04W 48/16* | (2009.01) | |
| *H04W 4/02* | (2018.01) | |
| *H04W 76/10* | (2018.01) | |
| *H04W 64/00* | (2009.01) | |
| *H04L 65/1063* | (2022.01) | |
| *H04L 101/668* | (2022.01) | |
| *H04W 84/12* | (2009.01) | |

(52) U.S. Cl.
CPC ......... *H04N 21/61* (2013.01); *H04N 21/8166* (2013.01); *H04W 4/02* (2013.01); *H04W 4/029* (2018.02); *H04W 4/50* (2018.02); *H04W 48/16* (2013.01); *H04W 48/18* (2013.01); *H04W 52/0245* (2013.01); *H04W 52/0254* (2013.01); *H04W 76/12* (2018.02); H04L 65/1063 (2013.01); H04L 2101/668 (2022.05); H04M 2250/10 (2013.01); *H04W 64/00* (2013.01); *H04W 76/10* (2018.02); *H04W 84/12* (2013.01); *Y02D 30/70* (2020.08)

(58) Field of Classification Search
CPC ............. H04W 48/18; H04W 52/0245; H04W 52/0254; H04W 84/12; H04W 76/10; H04W 64/00; H04L 65/4069; H04L 61/6068; H04L 65/1063; H04N 21/61; H04N 21/8166; H04N 21/25841; Y02D 30/70; Y02D 70/1262; Y02D 70/164; Y02D 70/166; Y02D 70/1242; Y02D 70/1224; Y02D 70/142; Y02D 70/144; Y02D 70/168; Y02D 70/23; Y02D 70/146; Y02D 70/1244; Y02D 70/162; H04M 2250/10

See application file for complete search history.

(56) References Cited

U.S. PATENT DOCUMENTS

| | | | |
|---|---|---|---|
| 7,653,039 | B2 | 1/2010 | Lee et al. |
| 7,890,099 | B2 | 2/2011 | Mohammed |
| 8,165,585 | B2 | 4/2012 | Gallagher et al. |
| 8,190,112 | B2 | 5/2012 | Corrigan et al. |
| 8,595,141 | B2 | 11/2013 | Hao et al. |
| 2002/0191575 | A1 | 12/2002 | Kalavade et al. |
| 2004/0185777 | A1 | 9/2004 | Bryson |
| 2004/0203737 | A1 | 10/2004 | Myhre et al. |
| 2005/0114534 | A1 | 5/2005 | Lee |
| 2006/0025138 | A1 | 2/2006 | Kotzin et al. |
| 2008/0057956 | A1 | 3/2008 | Black et al. |
| 2009/0124284 | A1 | 5/2009 | Scherzer et al. |
| 2009/0161688 | A1 | 6/2009 | Park et al. |
| 2009/0320077 | A1 | 12/2009 | Gazdzinski |
| 2010/0329226 | A1 | 12/2010 | Norefors et al. |
| 2011/0222533 | A1 | 9/2011 | Masaki |
| 2012/0290686 | A1 | 11/2012 | Anchan et al. |
| 2012/0311661 | A1 | 12/2012 | Forssell |
| 2013/0058274 | A1* | 3/2013 | Scherzer ............... H04W 12/08 370/328 |
| 2017/0118612 | A1 | 4/2017 | Shaw et al. |
| 2019/0274014 | A1 | 9/2019 | Shaw et al. |
| 2021/0127238 | A1 | 4/2021 | Shaw et al. |

OTHER PUBLICATIONS

Woyke, , "Cisco's Vision of The Future of Wi-Fi", Forbes, Jan. 24, 2011, Downloaded from the Internet on Jul. 12, 2012, at http://www.forbes.com/sites/elizabethwoyke/2011/01/24/ciscos-vision-of-the-future-of-wi-fi/2/.

* cited by examiner

600

METHOD AND APPARATUS FOR DELIVERY OF APPLICATION SERVICES

CROSS REFERENCE TO RELATED APPLICATIONS

This application is a continuation of U.S. patent application Ser. No. 17/142,858 filed Jan. 6, 2021, which is a continuation of U.S. patent application Ser. No. 16/417,199 filed May 20, 2019 (now U.S. Pat. No. 10,924,899), which is a continuation of U.S. patent application Ser. No. 15/398,403 filed Jan. 4, 2017 (now U.S. Pat. No. 10,341,827), which is a continuation of U.S. patent application Ser. No. 13/571,464 filed Aug. 10, 2012 (now U.S. Pat. No. 9,571,868). The contents of each of the foregoing are hereby incorporated by reference into this application as if set forth herein in full.

FIELD OF THE DISCLOSURE

The subject disclosure relates generally to a method and apparatus for delivery of application services.

BACKGROUND

Cellular radio communication services have evolved in a relatively brief period from early implementations offering voice only services, to voice with limited data services, such as short messaging service, to ever more robust data networks capable of delivering rich data services (e.g., 3G and long term evolution or LTE). Data services routinely expected by cellular subscribers may now include email, web browsing, and even streaming media services, such as streaming audio and streaming video. Unfortunately, demand for data rich applications seems to outpace technological advances.

At least one reason for such demand in a mobile cellular service is that subscribers have become accustomed to data rich services. Subscribers are familiar with Web browsing and their ever-expanding online experiences through their home and office networks. Home wireless networks and Wireless Fidelity (also known as Wi-Fi) hotspots provide subscribers with a sense that such data rich features are easily deliverable to any mobile device. Additionally, as mobile phones tend to become more like mobile computers, the line between phone and computer is blurred.

For the time being, mobile cellular radio networks have bandwidth constraints imposed by their very nature as radio networks. Namely, there are a limited number of frequencies available within a given geographic region to be shared by multiple cellular service providers and other wireless applications. Cellular services can be subject to more stringent regulatory constraints (e.g., wireless operational requirements imposed by the Federal Communications Commission (FCC)) than Wi-Fi services, which operate at much lower power levels. Accordingly, despite advances in processing power, storage capacity, and network availability, the constraints of limited over-the-air capacity of mobile cellular radio communications remain as a gating factor in delivery of rich data services.

BRIEF DESCRIPTION OF THE DRAWINGS

Reference will now be made to the accompanying drawings, which are not necessarily drawn to scale, and wherein.

DETAILED DESCRIPTION

Figure 1:
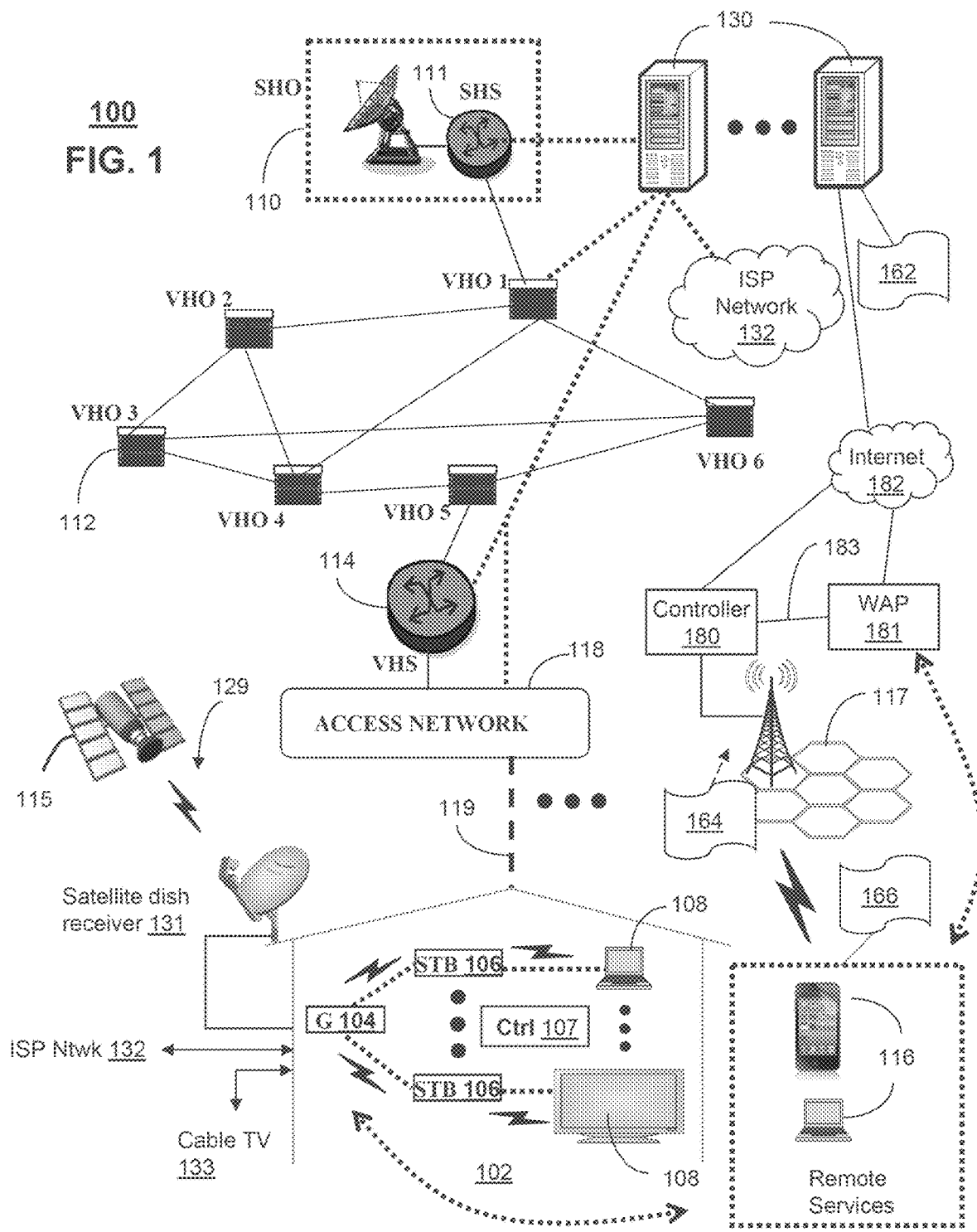
FIGS. 1-2 depict illustrative embodiments of communication systems that provide media services.

The subject disclosure describes, among other things, illustrative embodiments of devices, systems and processes that may include, for example, receiving from a mobile device, by way of a cellular network, a request for delivery of high-bandwidth application service. A location of the mobile device can be obtained and used to determine availability of any nearby wireless packet-network services. If it is determined that a wireless packet-network service is available, the mobile device can be directed to initiate a network connection between the mobile device and the wireless packet-network service. The request for delivery of high-bandwidth services can then be forwarded to an application server that delivers the requested services by way of the wireless packet-network service. Other embodiments are disclosed.

One embodiment of the subject disclosure includes a device having a memory storing computer instructions and a processor coupled to the memory. The processor can be operable to execute the computer instructions, to perform operations including receiving from a mobile device, by way of a cellular network, a first request for delivery of a streaming video application service. The processor is also operable to determine a location of the mobile device and to determine availability of a wireless packet-network service at the location of the mobile device. The processor is operable to direct the mobile device to initiate a network connection between the mobile device and the wireless packet-network service in response to a determination that the wireless packet-network service is available at the location of the mobile device. The processor is also operable to forward, to an application server, a second request for delivery of the streaming video application service to the mobile device by way of the wireless packet-network service.

Another embodiment of the subject disclosure includes a computer-readable storage medium that includes computer instructions which, responsive to being executed by a processor, cause the processor to perform operations including receiving from a mobile device, by way of a cellular network, a first request for delivery of a high-bandwidth application service. The processor can determine a location of the mobile device and can determine availability of a wireless packet-network service at the location of the mobile device. The processor can further provide instructions to the mobile device to cause the mobile device to initiate a network connection between the mobile device and the wireless packet-network service. The processor can also forward to an application server a second request for delivery of the high-bandwidth application service to the mobile device by way of the wireless packet-network service.

Yet another embodiment of the subject disclosure is a process which includes receiving, by a system having a processor, from a mobile device a first request for delivery of high-bandwidth application service. A location of the mobile device is determined by the system. Availability of a wireless packet-network service at the location of the mobile device is also determined by the system. A network connection of the mobile device to the wireless packet-network service can be based on information provided by the system to the mobile device. A request can be forwarded to an application server for delivery of the high-bandwidth application service to the mobile device by way of the wireless packet-network service.

FIG. 1 depicts an illustrative embodiment of a first system 100 for delivering media content. The system 100 allows for receiving requests from mobile devices over a cellular network for delivery of data services, such as a streaming video application service including Internet Protocol Television (IPTV) or Video-on-Demand (VoD). As will be described in more detail below, the system 100 further allows for a determination of a physical location of mobile devices making requests, as well as the availability of wireless packet-network service at the location of the mobile devices. In response to these requests, the system 100 allows or otherwise instructs the mobile devices to initiate or engage in a network connection with the wireless packet-network service. The system 100 further allows for modification of the requests for delivery of the requested data services, such that delivery of the requested services to the mobile devices can be made by way of the wireless packet-network service, rather than the cellular network.

The system 100 can represent an IPTV media system. The IPTV media system can include a super head-end office (SHO) 110 with at least one super head-end office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, power line or phone line wiring) or can operate over a wireless access protocol such as Wireless Fidelity (WiFi), Bluetooth, Zigbee, or other local or personal area wireless network technologies. By way of these interfaces, unicast communications can also be invoked between the media processors 106 and subsystems of the IPTV media system for services such as VoD, browsing an electronic programming guide (EPG), and/or other infrastructure services.

A satellite broadcast television system 129 can be used in the media system of FIG. 1. The satellite broadcast television system can be overlaid, operably coupled with, or replace the IPTV system as another representative embodiment of the system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of the system 100. In this embodiment, the cable TV system 133 can also provide Internet, telephony, and interactive media services.

The exemplary embodiments can utilize or otherwise include other over-the-air and/or landline media content service systems.

Some of the network elements of the IPTV media system can be coupled to one or more computing devices 130, a portion of which can operate as a web server for providing web portal services over the ISP network 132 to wireline media devices 108 and/or wireless communication devices 116.

The system 100 can also provide for all or a portion of the computing devices 130 to function as a controller (herein referred to as controller 130). The controller 130 can use computing and communication technology to perform a function of controlling offloading of delivery of data services over a cellular network, for example through the wireless base station 117. As an example, wireless base station 117 can be utilized for delivery of high-traffic or high-bandwidth services to remote devices 116. One or more of the wireless base station 117 and wireless communication devices 116 can be provisioned with software functions 164 and 166, respectively, to utilize the services of the controller 130, which in turn can be modified by software functions 162 to enable selectively offloading delivery of high-traffic services via one or more wireless access points providing wireless packet-network services.

In at least some embodiments, the software functions 164 and 166 allow for delivery of data services originally requested over a cellular network, through a wireless packet-network service. By way of example, one of the remote devices 116 requests delivery of streaming video services through the cellular network, by way of the base station 117. The base station 117 can include or is otherwise in communication with a controller 180. The controller 180, for example, can include a radio access terminal controller provided by the cellular service provider. The controller 180 can be configured to recognize requests for particular services, such as VoD, and implement special processing of such requests. In the illustrative example, the controller 180, receives a request from a remote device 116 through a cellular network for delivery of streaming video application services to the remote device 116. In at least some embodiments, the request need not provide any indication to suggest that delivery of the requested services would be other than by the cellular network through which the request was made. In response to receiving or otherwise identifying the request, the controller 180 first determines a location of the remote device 116 and then whether the remote device 116 is within range of a wireless packet-network service. Having located a wireless packet-network service within range of the remote device 116, the controller 180 can selectively attempt to re-direct delivery of the requested data service through the wireless packet-network service. Such redirection serves to alleviate the excess burden of delivering streaming video from the cellular network.

By way of example, the controller 180 compares the location of the remote device 116 with a predetermined list of wireless access points at predetermined locations (such wireless access points can be registered, certified, or otherwise identified or under the control of the cellular service provider). The controller 180 can compare the location of the remote device 116 with locations of one or more wireless access points. The controller can conclude an availability of service, for example, when a distance between the remote device 116 and the particular wireless access point 181 is within a wireless range of the wireless access point 181. Upon such a determination, the controller 180 can direct one or more of the remote device 116 and the wireless access point 181 to initiate a communication connection. Thus, the remote device 116 can establish wireless access to the packet-network service, without having to undertake one or more of the usual discovery processes to locate wireless access points within range and to establish authorization. The controller 180 can then forward a new or otherwise modified request, for example, to an application server, such as the video server 130, for delivery of the requested streaming video service to the remote device 116 by way of the wireless packet-network service. The second or otherwise modified request can provide the video server 130 with a determinable address of the remote device 116, then connected to the wireless access point 181, such as an Internet address. In at least some embodiments, this can be accomplished at the time of initiation of the services, or at a later time, during delivery initially occurring over the wide area network. The controller can be configured to ensure that state information is maintained during the transfer so as to avoid any disruption to services already being delivered during transfer from one network to the other.

Thus, a remote device 116 is allowed to request services through a wide area network, such as a cellular radio network, while receiving delivery of those services through a wireless local area network, such as an 802.11 compliant wireless network. Beneficially, the wide area network can offload data services to conserver bandwidth while imposing little or no restriction or limitation on the remote device 116 for implementing this capability.

In response to receiving the request for services, elements of, or in coordination with, the wide area network (e.g., a cellular base station controller) can identify a suitable wireless access point to the local area network based on a location of the remote device. The controller can then proceed to initiate or otherwise coordinate establishment of wireless connectivity between the remote device 116 and the wireless access point to the local area network. This would otherwise be accomplished through a wireless access point discovery and authorization process initiated by the remote device. Delivery of the requested services ultimately occurs through the established connection to the wireless local area network, freeing relatively scarce bandwidth of the wide area network, while delivering potentially bandwidth intensive services, such as streaming media.

In some embodiments, delivery of requested streaming video service can be accomplished by computing devices 130, acting as a video server that communicates with the remote device 116 through another network, such as the Internet 182. In the illustrative example, the wireless access point 181 is in networked communication with the Internet 182 through a dedicated networked connection, or backhaul link 183. Examples of such backhaul links include one or more of a cable carrier, an ISP network, a dial-up network, a satellite network, and the like. The controller 180 can, in some embodiments, be in networked communication with the wireless access point 181, for example, through one or more of the Internet 182, or other available network, such as a private cellular carrier. In at least some embodiments, the wireless packet-network service can be provided to the remote device 116 through the gateway 104 (e.g., if a location of the mobile device 116 is within wireless range of the gateway 104).

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other types of wide area wireless access network technologies can be utilized with the exemplary embodiments.

Figure 2:
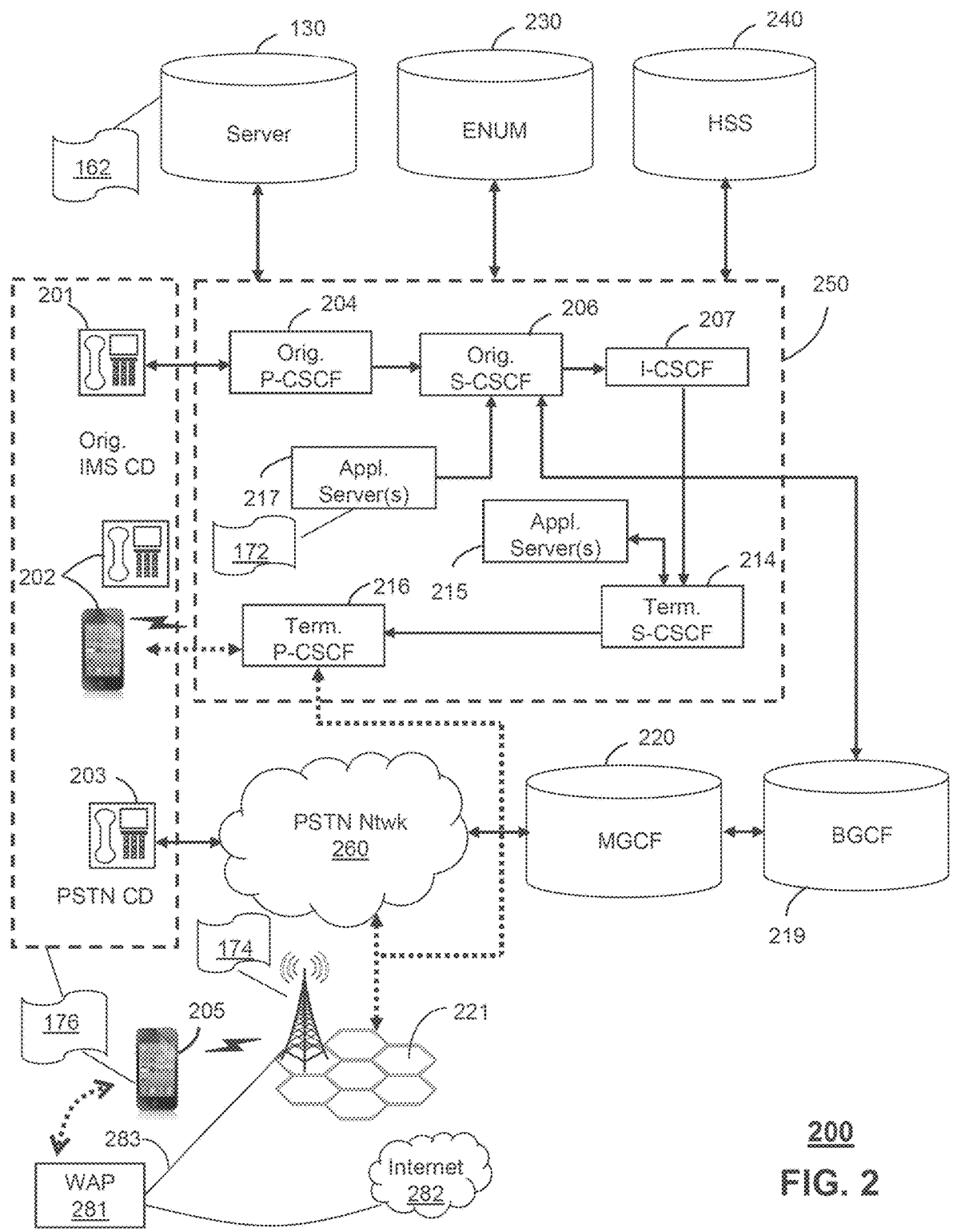

FIG. 2 depicts an illustrative embodiment of a communication system 200 employing an IP Multimedia Subsystem (IMS) network architecture to facilitate the combined services of circuit-switched and packet-switched systems. The system 200 allows for receiving requests from a mobile device over a cellular network for delivery of a data service, such as a streaming video application service, such as IPTV or VOD. As will be described in more detail below, the system 200 further allows for a determination that the mobile device is within range of a wireless packet-network service, and the system can modify the request to allow for delivery of the requested service over the wireless packet-network service, rather than over the cellular network. Modification can include among other features, changing a delivery address from a cellular network address (e.g., mobile phone number) to a wireless packet-network service address (e.g., a packet network or Internet address). Thus, an original request can be intercepted and modified, or otherwise replaced by another request that is sent or passed along to the appropriate application server. The application server, in turn, delivers the requested service according to the new or modified delivery address. The communication system 200 can be overlaid or operably coupled with the system 100 as another representative embodiment of the system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of the system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline and/or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies can be applied to the subject disclosure. Accordingly, multiple wireline and wireless communication technologies can be used by the CDs of FIG. 2.

Cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The controller 130 of FIG. 1 can be operably coupled to the second communication system 200 for purposes similar to those described above. The server/controller 130 can perform function 162 and thereby facilitate enhanced bandwidth management of the wireless network 117, by selectively offloading delivery of high-traffic services to the CDs 201, 202, 203 and 205 of FIG. 2. CDs 201, 202, 203 and 205, can be adapted with software to perform function 176 to utilize the services of the controller 130. It is further contemplated that the controller 130 can be an integral part of the application server(s) 217 performing function 172 or the cellular base station performing function 174, each of which can be substantially similar to function 162 and adapted to the operations of the IMS network 250.

By way of example, the cellular base station function 174 can be configured to receive a request for high-traffic data services, such as streaming video application services, and to undertake actions to offload delivery of such services from the cellular network to another network, such as a wireless packet-network service. In the illustrative example, a mobile device, such as a cell phone 205, requests delivery of streaming video services through the cellular network. For example, the cellular base station function 174 detects the request and determines a location of the mobile device 205, described in more detail below. The cellular base station function 174 then determines availability of a wireless packet-network service at the location of the mobile device 205, for example, from a lookup table or other suitable database of available wireless access points. Once the availability of wireless packet-network services has been established, the cellular base station function 174 can direct the mobile device 205 to initiate a network connection with a corresponding wireless access point 281. The cellular base station function 174 can then forward a request for the controller 130 to direct delivery of the requested streaming video application services through the established wireless packet-network service. In some embodiments, the wireless access point 281 can be in networked communication with the Internet 282 through a dedicated networked connection, or backhaul link 283 and/or through a private cellular carrier. Thus, the cellular network can redirect delivery of requested data services to another network, to offload or otherwise maintain available bandwidth for other wireless users. Additionally, implementation of such transfers from one network to another can be accomplished by a network controller, with little or no special modification required by the mobile device 205. Further, energy savings can be realized on the mobile device by alleviating the mobile device from the burden of having to undertake discovery of wireless local area networks, and the need to identify preferred wireless local area networks from others. Such a process might otherwise be cumbersome by repeated attempts to identify or otherwise connect to a suitable wireless access point from among a number of wireless access points that might happen to be within a range.

Figure 3:
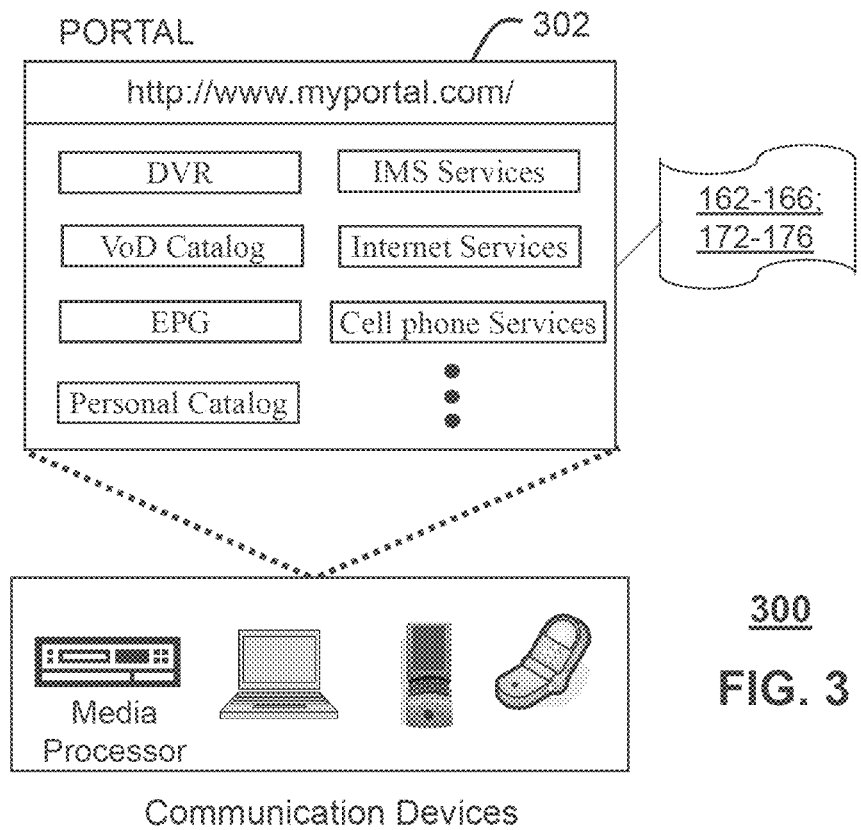
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the system 100 illustrated in FIG. 1. The portal system 300 allows for interaction with communication systems, such as those systems 100. 200 illustrated in FIGS. 1 and 2. Such controlled interaction can include receiving requests from a mobile device over a cellular network for delivery of a data service (e.g., a streaming video application service, such as IPTV or VOD). As described herein, the systems 100, 200 allow for a determination that the mobile device is within range of a wireless packet-network service, and allow for modifying the request to enable delivery of the requested service over the wireless packet-network service, rather than the cellular network. The portal 302 can be used, for example, to control parameters related to implementation of such features. Such parameters can include user preferences, such as restrictions on offloading, registration of wireless access points, preferences for determining a location of the mobile device, and the like.

The web portal 302 can be used for managing services of the systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

The web portal 302 can further be utilized to manage and provision software applications 162-166, and 172-176 to adapt these applications as may be desired by subscribers and service providers of the systems 100-200. For example, the web portal 302 can be used to enter preferences for data service offloading, identification of predetermined locations, predetermined Wi-Fi hotspots, and the like.

Figure 4:
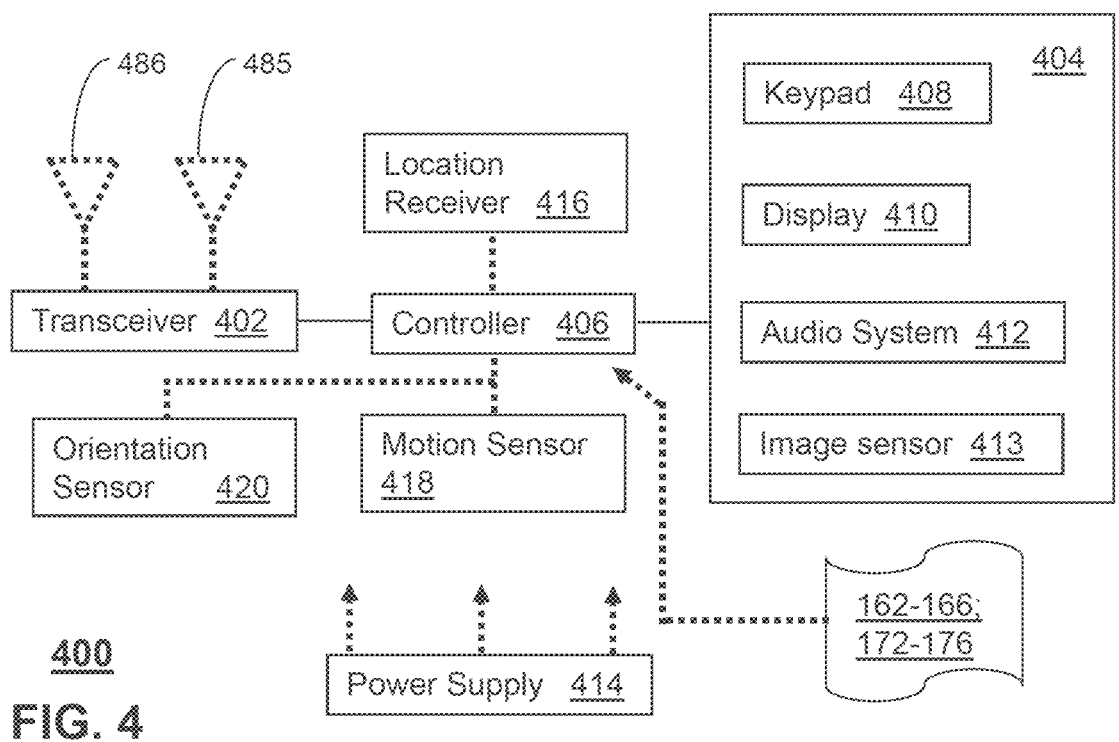
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other wireless communication technologies. The transceiver 402 can also be adapted to support circuit-switched wireline access technologies (such as PSTN), packet-switched wireline access technologies (such as TCP/IP, VoIP, etc.), and combinations thereof. In at least some embodiments the transceiver 402 alone or in combination with another transceiver (not shown) provides communication services over more than one different network. For example, the transceiver 402 can be configured to communicate over a cellular network, for example, through a cellular antenna 485. Alternatively or in addition, the transceiver 402 can be configured to communication with a wireless packet network service, for example, through a Wi-Fi antenna 486. Although separate antennas 485, 486 are illustrated in the example embodiment, it is understood that other antenna configurations are possible, such as a single antenna configured to support communication over both the cellular and Wi-Fi network services.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 can be used. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other devices that can operate in the systems 100-200 of FIGS. 1-2 such as a gaming console and a media player.

The communication device 400 shown in FIG. 4 or portions thereof can serve as a representation of one or more of the devices of the systems 100-200. The controller 406 can also be adapted in various embodiments to perform one or more of the functions 162-166 and 172-176, respectively.

Figure 5:
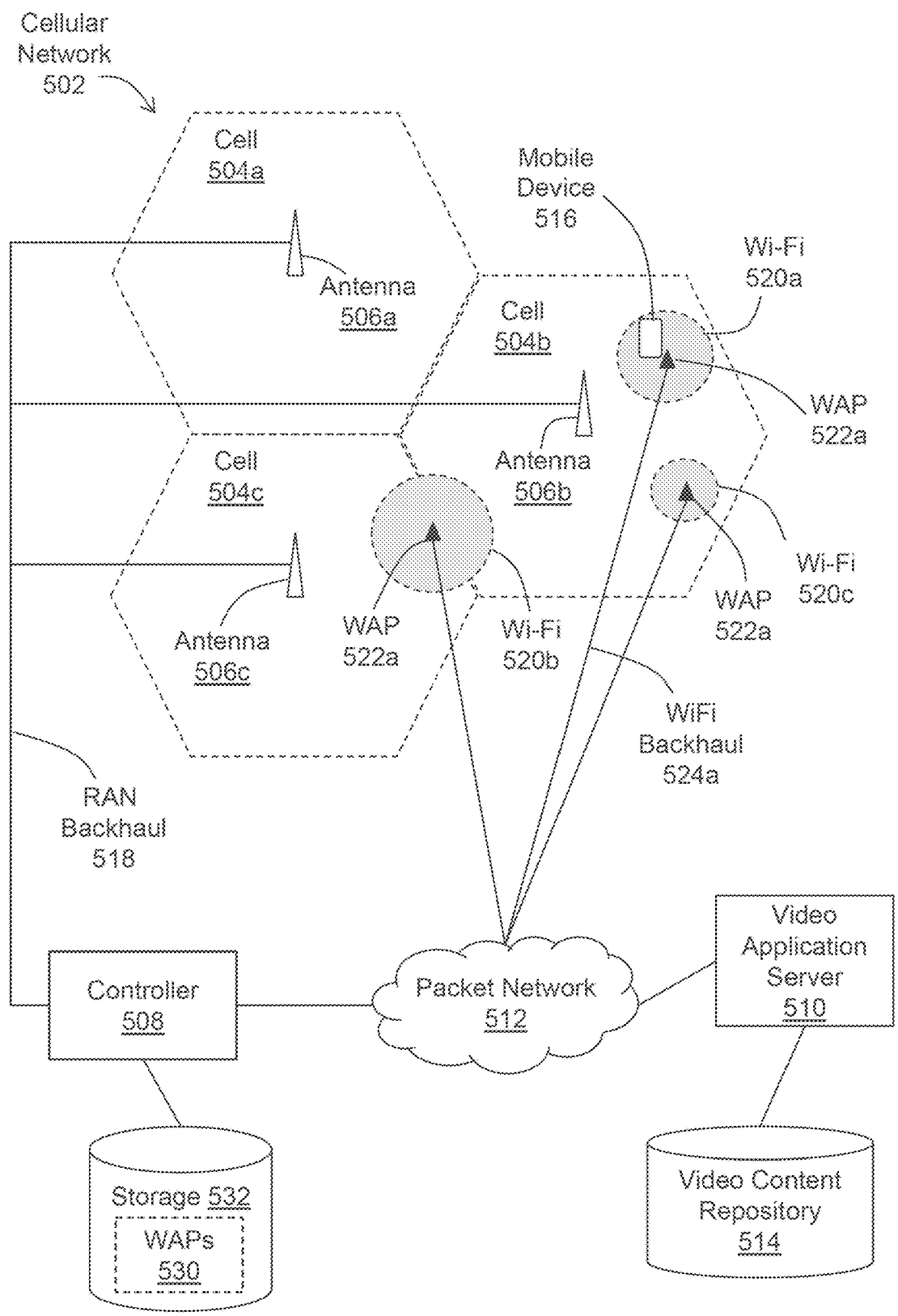
FIG. 5 depicts an illustrative embodiment of a system that performs location-based delivery of high-bandwidth application services.

FIG. 5 depicts an illustrative embodiment of a system 500 that performs location-based delivery of high-bandwidth application services. The system 500 includes a cellular network 502 that includes one or more cells 504a, 504b, 504c (generally 504). Each cell includes a respective antenna 506a, 506b, 506c (generally 506) providing radio coverage in a respective territorial area 504. Each antenna 506 of the cellular network 502 is coupled to at least one controller 508. In the illustrative example, a single controller 508 is coupled to multiple antennas 506 through a mobile carrier backhaul network 518. The mobile carrier backhaul network 518 can include one or more suitable communication technologies, such as broadband cable, optical fiber (e.g., synchronous optical network (SONET)), wireless (e.g., satellite, terrestrial radio, microwave, free-space optical), digital subscriber line (DSL), integrated services digital network (ISDN), and the like. It is understood that in some embodiments, at least some of the antennas include a local controller 508 (not shown).

The cellular network 502 is in communication with a video application server 510, for example, through a packet network 512, as shown. The packet network 512 can include one or more of a local area network, a metropolitan network, and a wide area network. The packet network 512 can also support transmission control protocol/Internet protocol network, as in the Internet. The video application server provides high-bandwidth services, such as streaming video. In the illustrative example, the video application server 510 is in communication with at least one video content repository 514. The video content repository 514 can include mass storage capable of storing a catalog of video program content.

In at least some embodiments, the video application server 510 is configured to deliver one or more selected video programs in a streaming video format in response to a request from a requesting device. For example, a mobile device 516, such as a smart phone, submits a request for streaming video services to the video application server 510 through the cellular network 501. In more detail, the mobile device 516 communicates wirelessly with an antenna 506b of a cell 504b. Such wireless cellular communications can include any suitable wireless technology, such as: universal terrestrial radio access network (UTRAN); evolved universal terrestrial radio access network (E-UTRA), otherwise known as long term evolution (LTE); global system for mobile communications (GSM); general packet radio service (GPRS); code division multiple access (CDMA); evolution-data optimized (EV-DO); enhanced data rates for global system for mobile communications evolution (EDGE); universal mobile telecommunication system (UMTS); digital enhanced cordless telecommunications (DECT); digital advanced mobile phone system (D-AMPS); integrated digital enhanced network (iDEN), and combinations thereof.

The mobile device 516 submits a request for streaming video service, for example from a mobile application or "App," resident on the mobile device 516. In some embodiments, the request is received wirelessly at the antenna 506b and forwarded to the controller 508 over the mobile carrier backhaul network 518. The request for streaming video service can include a video program. The controller 508, in turn, forwards the request to the video application server 510. In the illustrative embodiment and without limitation, the request is forwarded over a different network, such as the packet network 512, which can operate as part of the Internet, or a private network. The video application server 510 interprets the request, obtains the requested video program from the video content repository 514 and establishes streaming video service with the mobile device 516, providing the requested video program through the cellular network 502, such as 3G and 4G LTE enabled networks.

Such streaming video services represent high-bandwidth services, which can place a substantial demand on generally limited bandwidth resources of the cellular network 502. The present disclosure includes techniques for offloading at least some high-bandwidth services to mobile devices 516 of subscribers by redirecting such services initially requested through the cellular network 502 to a separate network. An example of one such network suitable for offloading is wireless packet-network service. Without limitation, one such class of wireless network service is described by the IEEE 802.11 family of standards (e.g., IEEE 802.11a/g/n) from the cellular network 502. The Wi-Fi Alliance defines Wi-Fi as any wireless local area network product that is based on the IEEE 802.11 standards.

Also illustrated in FIG. 5 are Wi-Fi "hot spots" 520a, 520b, 520c (generally 520). Each Wi-Fi hotspot has a respective coverage area shown as the dashed circle drawn about a respective wireless access point (WAP) 522a, 522b, 522c (generally 522). Each wireless access point 522 is in communication with a computer network, such as the Internet 512 through a respective Wi-Fi backhaul network 524a. The Wi-Fi backhaul network 524a can include any suitable communications technology, such as the technologies and services disclosed above in relation to the mobile carrier backhaul network 518. Whereas a cell 504 might include several city blocks, servicing a potentially larger number of subscribers, Wi-Fi hotspots 520 can be substantially smaller, perhaps 100-200 feet, servicing far fewer clients. As such, requests for high-bandwidth services through Wi-Fi hotspots 520 can be used to service requests for high-bandwidth services, such as streaming video, including VoD.

As shown in the illustrative example, one or more of the hotspots 520 reside within one or more cells 504 of the cellular network 502. Thus, there will be situations in which a cellular network subscriber, represented here by the mobile device 516, happens to be within one or more Wi-Fi hotspots 520. In the illustrative example, the mobile device 516 is served by a cell 504b, while also residing within coverage of a hotspot 520a. By identifying such situations and according to the techniques disclosed herein, a cellular network provider can receive a request for high-bandwidth service over the cellular network 502, and facilitate service of the request through the Internet by way of the Wi-Fi hotspot 520a.

In at least one implementation, the controller 508 receiving a request from the mobile device 516, can identify the mobile device 516 from its association with the cellular network 502. The controller 508 can be configured to obtain a location of the mobile device 516, for example by requesting a self-identified location as may be available by a global positioning system (GPS) service of the mobile device 516. Other self-identified locations might include an address, or other feature identifying location, such as a particular retail store in a given city, state, and/or zip code. Such identifying features might be provided by a user of the mobile device 516 along with a request for streaming video service, or in response to a network query for such location information prompted by such a request. Alternatively or in addition, the location of the mobile device 516 can be determined by external means. At least one example of such external means includes localization by multilateration (e.g., triangulation) of radio signals received from the mobile device 516 by several radio antennas 506 of the cellular network 502.

Once an approximate location of the mobile device 516 has been established and identified at the controller 508, the controller can consult a predetermined listing of hotspots 520 to determine whether the location of the mobile device 516 is within a coverage area of one or more of the hotspots. By way of example, such a predetermined listing of hotspots 530 can be stored on a storage device 532. The listing can be in the form of a database, a table, or any suitable format to facilitate search and retrieval of hotspot information. The listing of hotspots 530 might include a geographic location of a hotspot 520, such as a GPS position (e.g., latitude, longitude) and/or an address. Alternatively or in addition, the listing of hotspots 530 also includes an indication of the associated coverage area or range of each of the listed hotspots 520. Such an indication of coverage might include a radius in feet or meters, which can be used in combination with the listed location of the wireless access point 522 of the hotspot 520 to determine an approximate circumference defining a respective coverage area 520. The controller 508 can be configured through mathematical calculations generally used in geo-location and navigation to determine whether the mobile device 516 requesting service falls within coverage area (e.g., a circumference) of one or more of the listed hotspots 520.

In some embodiments, movement of the mobile device 516 can be taken into consideration. For example, a trajectory of a moving mobile device 516 can be calculated by the controller 508. Such a trajectory can be calculated based on successive positional updates and a measure of time between such updates. A velocity can be determined from such positional updates so as to provide a direction and a velocity. Such a trajectory can be used, for example, by the controller 508 to determine whether a mobile device 516 not yet within coverage of a hotspot is heading towards a hotspot, or whether a mobile device 516 already within a hotspot may be moving out of a coverage of the hotspot. Such advanced indications of a future position of the mobile device 516 as can be determined according to a trajectory, can be used by the system to pre-coordinate transitions between a cellular network and one or more WiFi hotspots 520.

Once at least one candidate hotspot 520 within range of the mobile device 516 has been identified, the controller 508 can initiate or otherwise facilitate establishment of a network connection between the mobile device 516 and the wireless access point 522 of the hotspot 520, such as providing information to the mobile device to cause the mobile device to initiate the network connection. For example, the mobile device 516 can be preconfigured with one or more applications that allow such remote manipulation of Wi-Fi network connections by the cellular service provider. Once the mobile device 516 has connected to the Internet through the Wi-Fi network of the hotspot 520, the controller 508 can direct or otherwise request that the original request of the mobile device 516 be serviced through the packet-network services available through the Wi-Fi hotspot 520, and not through the cellular network 502. The video application server 510 can then proceed to deliver the requested high-bandwidth service, such as streaming video, through the packet-network.

In at least some embodiments, the controller 508 can facilitate such packet-network delivery by modifying the original request to provide the video application server 510 with an internet address of the requesting mobile device 516 obtained through the packet network. Once again, an application provided on the mobile device 516 can be configured to obtain the Wi-Fi internet address, once established, providing it to the controller 508 of the cellular network service provider, such that the controller 508 can forward it to the video application server 510 by way of the modified request.

In at least some embodiments, the controller 508 can be notified of a loss of Wi-Fi service to the mobile device 516 engaging in the delivery of such high-bandwidth services. For example, the mobile device 516 can provide an indication through the cellular network 502 that the Wi-Fi connection has been lost or compromised. Alternatively or in addition, the video application server 510, can be configured to detect or otherwise conclude a loss or compromise of the delivery of the high-bandwidth services, providing a suitable notification to the controller 508. For example, the video application server 510 can maintain an IP address of the controller 508 associated with the request being serviced, such that a notification of loss of service can be provided to the same controller 508. The controller 508, in turn, can attempt to re-establish deliver of the originally requested high-bandwidth services by re-establishing a Wi-Fi connection, repeating one or more of the actions disclosed above. Alternatively, or after unsuccessfully making one or more such attempts to reconnect through Wi-Fi, the controller 508 can be configured to establish delivery of the originally requested high-bandwidth services through the cellular network 502.

In at least some embodiments, the controller 508 can be configured to selectively deliver such high-bandwidth services through the cellular network 502 or the packet network 512, according to one or more of business rules and various conditions. Examples of some conditions that could be relevant include actual usage (e.g., number of active subscribers, bandwidth usage), time of day (e.g., busy hour), geographic locations (e.g., urban, rural), class of service (e.g., a premium service might be more likely to deliver services through cellular network 502). Business rules can be established to manage offloading of high-bandwidth services according to one or more of such conditions.

Figure 6:
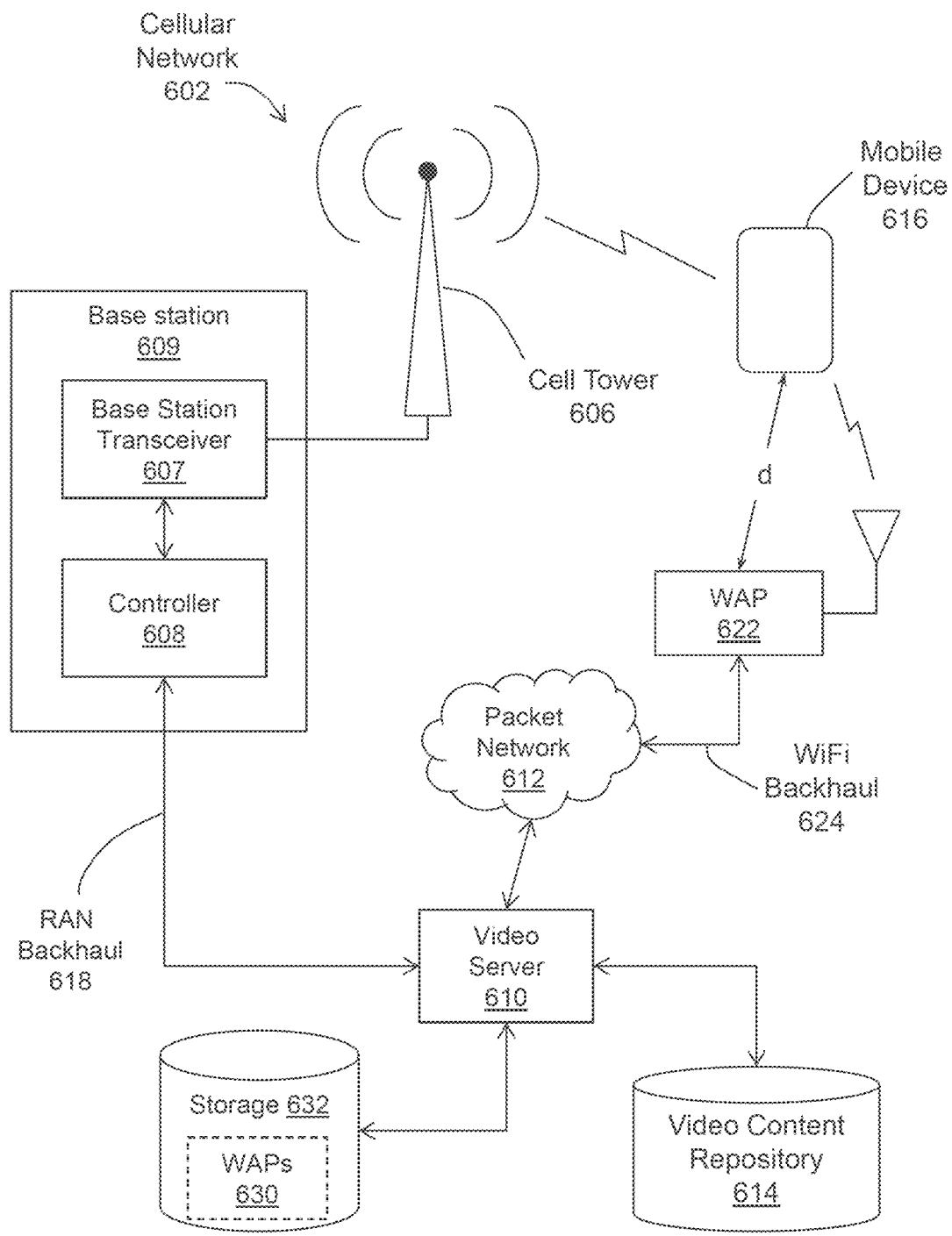
FIG. 6 depicts an illustrative embodiment of another system that performs location-based delivery of high-bandwidth application services.

FIG. 6 depicts another embodiment of a system 600 that performs location-based delivery of high-bandwidth application services. At least one feature of the illustrative system 600 that can differ from the previous embodiment of FIG. 5, is connection of a video server 610 directly to the cellular network 602, for example, through the radio access network backhaul network 618 of the cellular network 602.

In the illustrative embodiment, a mobile device 616 is in radio communication with a cell tower or antenna 606 of the cellular network 602. The antenna 606 is coupled to a base station transceiver that terminates one side of the wireless, or air-interface with the mobile device 616. The air-interface can be established or otherwise defined according to a suitable wireless protocol, such as any of the wireless services referred to herein. The base station transceiver is coupled to a controller 608, shown here collocated with the base station transceiver in the base station 609, although it is understood that the controller 608 can be located remotely from the base station 609, for example, accessible through the radio access backhaul network 618. Accordingly, one such controller can be configured to serve one or more base stations 609.

As in the previous example, the mobile device 616 initiates a request for a high-bandwidth service, such as a streaming video service as might be available through a mobile device application (e.g., a Netflix® application for Android® phones). The request is wirelessly transmitted from the mobile device 616 to the cell tower 606 and received at the base station transceiver 607. The request for service is then forwarded to the controller 608, which may interpret that the request is for streaming video service. Accordingly, the controller 608 can forward the request to the video server 610 through the radio access network backhaul network 618. The video server 610, in turn, services the request by obtaining a requested video program from a video catalog of programs as might be available on a video content repository 614, as shown. In at least some instances, the requested program is streamed from the video server 610 to the mobile device 616, through the cellular network 602.

For reasons similar to those discussed above, it may be advantageous in at least some situations to offload delivery of such high-bandwidth services to a network separate from the cellular network. As described above, one such class of networks is referred to generally as packet network 612, which can include any suitable computer network able to deliver streaming video services. Once again, the mobile device 616 can access the packet network 612 through a wireless access point 622, as shown, when the mobile device is within a coverage area of a Wi-Fi hotspot of the wireless access point. A distance, d, is illustrated indicating a separation distance between the mobile device and an identifiable wireless access network 622. In this instance, the location of the mobile device can be obtained by at least one of the controller and the video server 610. A predetermined list 630 of Wi-Fi hotspots can be consulted by at least one of the controller 608 and the video server 610 to identify one or more candidate Wi-Fi hotspots available to the requesting mobile device 616. Once a suitable Wi-Fi hotspot has been determined, for example according to techniques similar to those disclosed in the previous example, at least one of the controller 608 and the video server 610 can initiate connection of the mobile device to the identified wireless access point 622. Such coordination of this connection can be initiated by way of the cellular network 602 using, for example, techniques disclosed herein or otherwise generally known to those skilled in the art.

Figure 7:
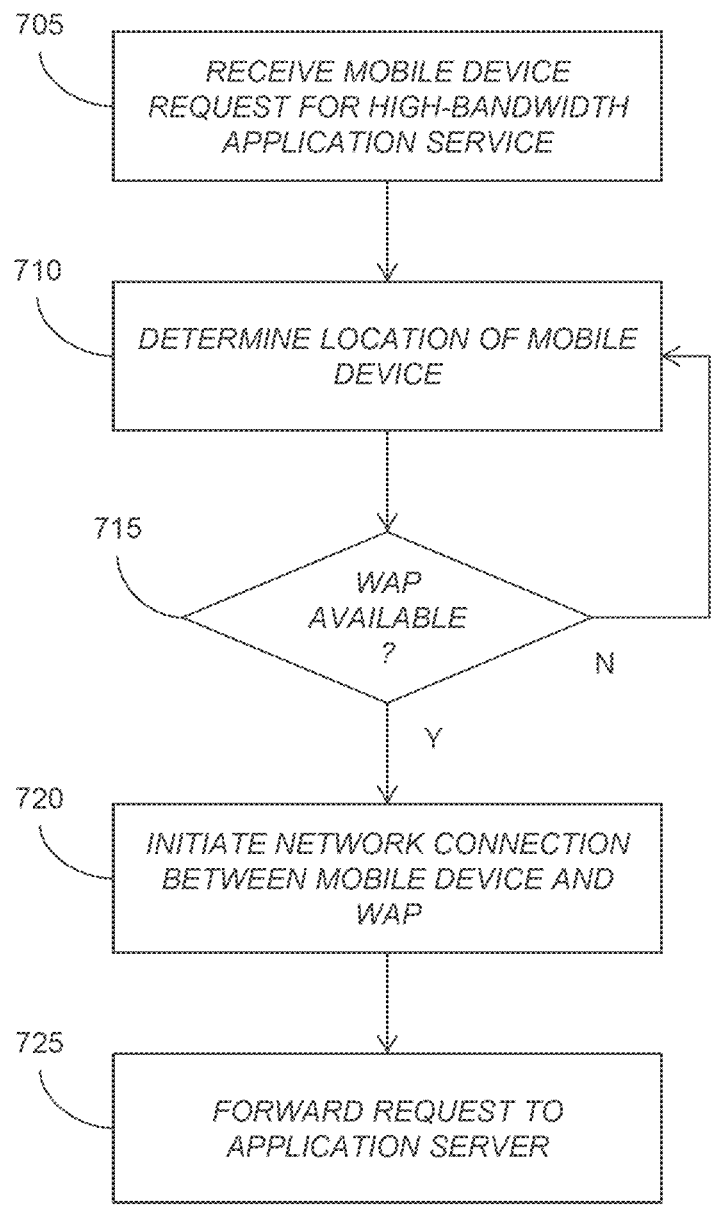
FIG. 7 depicts an illustrative embodiment of a process operating in portions of the systems described in FIGS. 1-6.

FIG. 7 depicts an illustrative embodiment of a process operating in portions of the systems and devices described in FIGS. 1-6. The process 700 can begin with step 705, in which a request for high-bandwidth application service is received from a mobile device, as used herein, a mobile device, such as the mobile device 516 (FIG. 5) and the mobile device 616 (FIG. 6), includes any device capable of undertaking at least wireless data communications. Such devices include, without limitation, mobile phones, tablets computers, personal data assistants, laptop computers, net book computers, multi-media displays, game controllers, and more generally any wireless network accessible device. High-bandwidth application service can be any application providing data and/or voice services, such as streaming media, including streaming video, streaming audio, data transfers (e.g., file transfer protocol), and the like.

The process 700 can continue with step 710, in which a location of the mobile device 516, 616 associated with the aforementioned request for high-bandwidth application service, is determined. As discussed herein, the location can be determined from the mobile device itself, as in a GPS location determined by a GPS feature of the mobile device 516, 616, or by a user entered location, such as an address, or retail outlet, or any suitable indication of location. Such determination of location can also be determined from presence information that might be maintained on the mobile device 516, 616 and/or on a local and/or remote application tracking such presence status. Alternatively or in addition, the location can be determined externally, for example, by radio-location techniques using signals received from the mobile device 516, 616. Such signals when received at more than one cell tower 506, 606 can be used in combination with a measured signal strength to estimate a location of the mobile device 516, 616, for example by triangulation techniques.

Having determined or otherwise estimated a location of the mobile device 516, 616, the process 700 can continue with step 715, in which it is determined whether a wireless access point is available. Such wireless access points can include the Wi-Fi hotspot access points 522, 622 disclosed herein. As described above, a listing of available wireless access points 522, 622 can be pre-established, for example, as a result of a registration process, a discovery process, or a lookup on a suitable database listing of wireless access points. A location of each listed wireless access point is obtained, in at least some instances, with a measure of coverage, such as a range. When no such range is available, a range can be estimated or otherwise established, for example, from prior experience with the same wireless access point. In this sense, the predetermined listing of wireless access points 530, 630 can be periodically updated to account for observed or otherwise stated changes or modifications to coverage of the listed wireless access points 520, 630.

In at least some embodiments, additional measures, such as reliability, availability, and/or quality of service are also included in the predetermined listing 530, 630. Such measures can be helpful in instances when a mobile device 516, 616 is within coverage area of more than one Wi-Fi hotspot. An algorithm can be implemented in one or more of the controller 508, 608 and the video server 510, 610 to choose from among the more than one available wireless access points. For example, a wireless access point having a greater reliability, availability and/or quality of services can be selected over one or more others.

If no such wireless access point is available, the process 700 can continue to monitor or otherwise determine a location of the mobile device at step 710, subsequently determining whether a wireless access point is available at step 715. For example, a location of a mobile device that is moving will change and potentially enter and exit coverage areas of wireless hotspots.

Once a wireless access point has been identified at step 715, the process can continue with step 720, in which a network connection between the mobile device 516, 616 and the identified or otherwise selected wireless access point 522, 622 is initiated. Such initiation can be directed by one or more of the controller 508, 608 and the video server 510, 610. Such connectivity can be confirmed, for example, by a message from the mobile device 516, 616, received by one or more of the controller 508, 608 and the video server 510, 610 over the packet network 512, 612. Alternatively or in addition, such connectivity can be established according to a "ping" of the mobile device 516, 616 by one or more of the controller 508, 608 and the video server 510, 610, over the packet network. In one embodiment, instructions or other information can be provided to the mobile device 516, 616, such as from the controller 508, 608, which requests, instructs or otherwise causes and/or enables the mobile device to connect with one or more wireless access points 516, 616.

After having initiated network connection at step 720, the process 700 can continue with step 725, in which a request to deliver high-bandwidth service, such as streaming video, is forwarded to the video server 510, 610. The video server 510, 610, in turn, proceeds to deliver the requested service using the packet network 512, 612.

Figure 8:
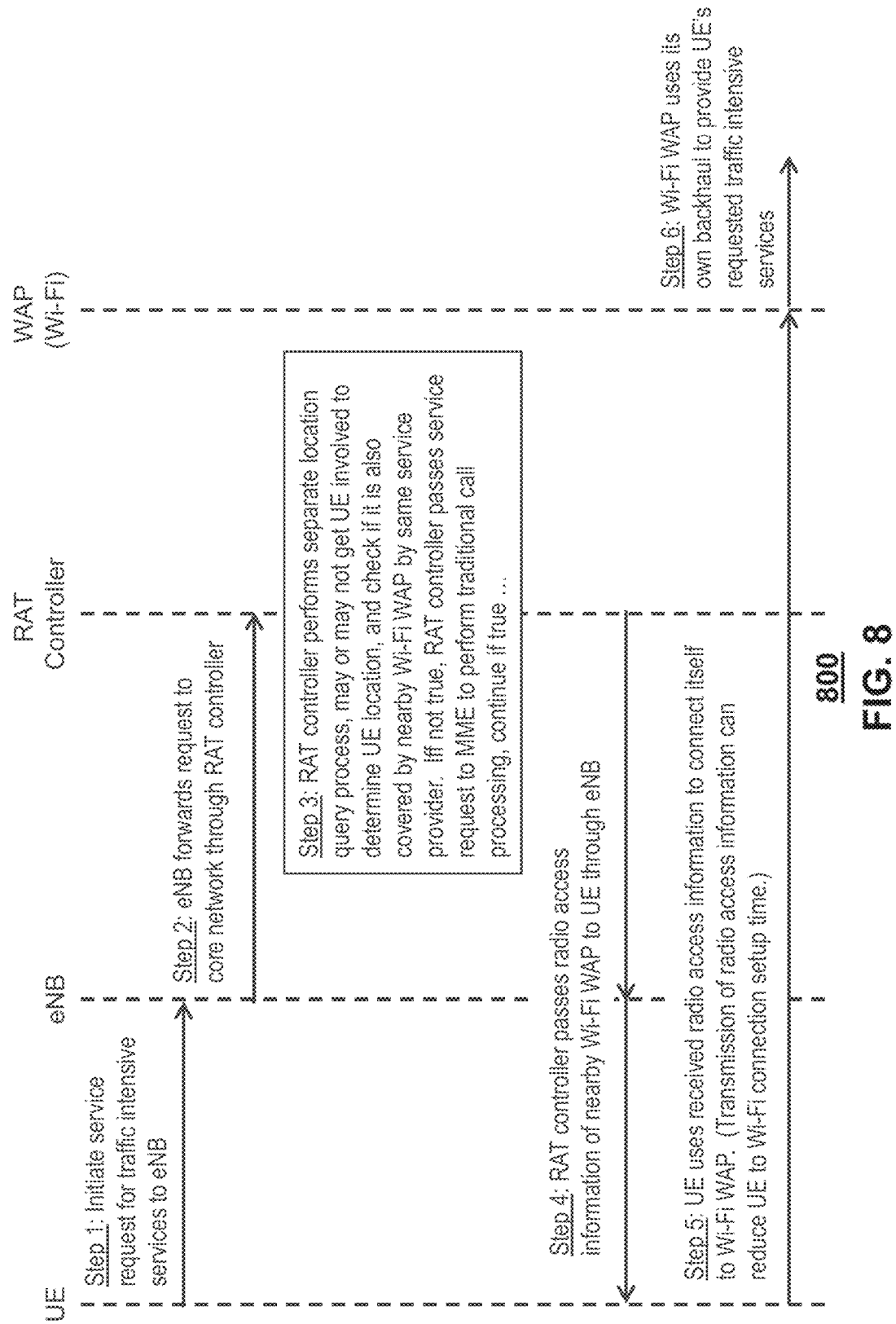
FIG. 8 depicts an alternative illustrative embodiment of a process operating in portions of the systems described in FIGS. 1-6.

FIG. 8 depicts an alternative illustrative embodiment of a process operating in portions of the systems described in FIGS. 1-6. The vertical dashed lines represent certain components of the system 500, 600. Namely the "UE" refers to user equipment and can refer to the mobile device 516, 616. The "eNB" can refer to equipment at the cell site 504 terminating the wireless, or "air interface," such as the E-UTRAN Node B, also known as Evolved Node B, of the E-UTRA or LTE wireless systems. The "RAT Controller" refers to a radio access terminal controller, such as the controllers 508, 608 disclosed above, and the WiFi hotspot can refer to the Wi-Fi hotspots 522, 622 also disclosed above.

The uppermost horizontal arrow from UE to eNB represents an initial step (i.e., Step 1), in which the mobile device 516, 616 initiates a service request for traffic-intensive services to the eNB. In a second step (i.e., Step 2), represented by the uppermost arrow between the eNB and the RAT Controller, the eNB forwards the request to the "core network," referring to the mobile service providers network, through the RAT Controller. In a third step (i.e., Step 3), the RAT Controller performs a separate location query process, which may or may not involve the UE, to determine a physical location of the UE and to determine whether the determined physical location is covered by a nearby Wi-Fi hotspot, for example, by the same service provider. If this is not true, the RAT Controller passes the service request to the Mobility Management Entity (e.g., the key control-node for an LTE access network) to perform traditional call processing.

In another embodiment, if a determination that the determined physical location of the UE is covered by a nearby Wi-Fi hotspot, the RAT Controller (controller 508, 608) passes the radio access information to the nearby WiFi hotspot (520, 620) to the UE (mobile device 516, 616) through the eNB (base station 609) in a fourth step (i.e., step 4). In a fifth step (i.e., Step 5), the UE uses received radio access information from the RAT Controller to connect itself to the Wi-Fi hotspot. The transmission of radio access information can be helpful in facilitating or otherwise reducing setup time associated with wireless packet-network connectivity between the UE and the Wi-Fi. In a sixth step (i.e., Step 6), the Wi-Fi hotspot uses its own backhaul (e.g., backhaul 524a) to provide the UE's requested traffic intensive services.

Upon reviewing the aforementioned embodiments, it would be evident to an artisan with ordinary skill in the art that said embodiments can be modified, reduced, or enhanced without departing from the scope and spirit of the claims described below. For example, the various processes disclosed herein can be implemented by a single entity, such as a controller 508, 608, or an application and/or video server 510, 610, or apportioned among more than one of such entities, or additional entities as may be network accessible, such as other servers and/or controllers.

In some embodiments the hotspots are provided by the cellular network service provider. In other embodiments, at least some of the available hotspots are provided by others, such as retailers, businesses, municipalities, educational institutions, and personal home hotspots. Although not necessary, information relating to at least some of the hotspots provided by others can be pre-announced to or otherwise discoverable by the cellular network service provider. For example, such announcement can be included under a certification process whereby certain information related to the hotspot is provided to the service provider. Such information can include one or more of a location, a range or coverage area, a name, a network address, such as an Internet protocol address, and the like.

In some embodiments, the network service provider coordinates a network test to determine whether network connectivity, once established, between the mobile device and the hotspot will be sufficient to support the requested service. Such network tests can include one or more of received signal strength, bit error rate, Eb/No, or any suitable measure of a quality of service (QOS) and the like. Automatic transfer of a requested service between a cellular network and a hotspot can be made contingent upon results obtained from such network tests.

In at least some instances, a hotspot host, such as a retail store, wirelessly provides an identification message, for example, through one or more of Bluetooth, WiFi, or radio frequency identification (RFID) to mobile devices as the user walks in or otherwise comes within wireless range of the hotspot. In at least some embodiments, information provided by the hotpot host also identifies the availability of Internet access via WiFi and whether this service is available to the public (e.g., Starbucks®). Other embodiments are contemplated by the subject disclosure.

Figure 9:
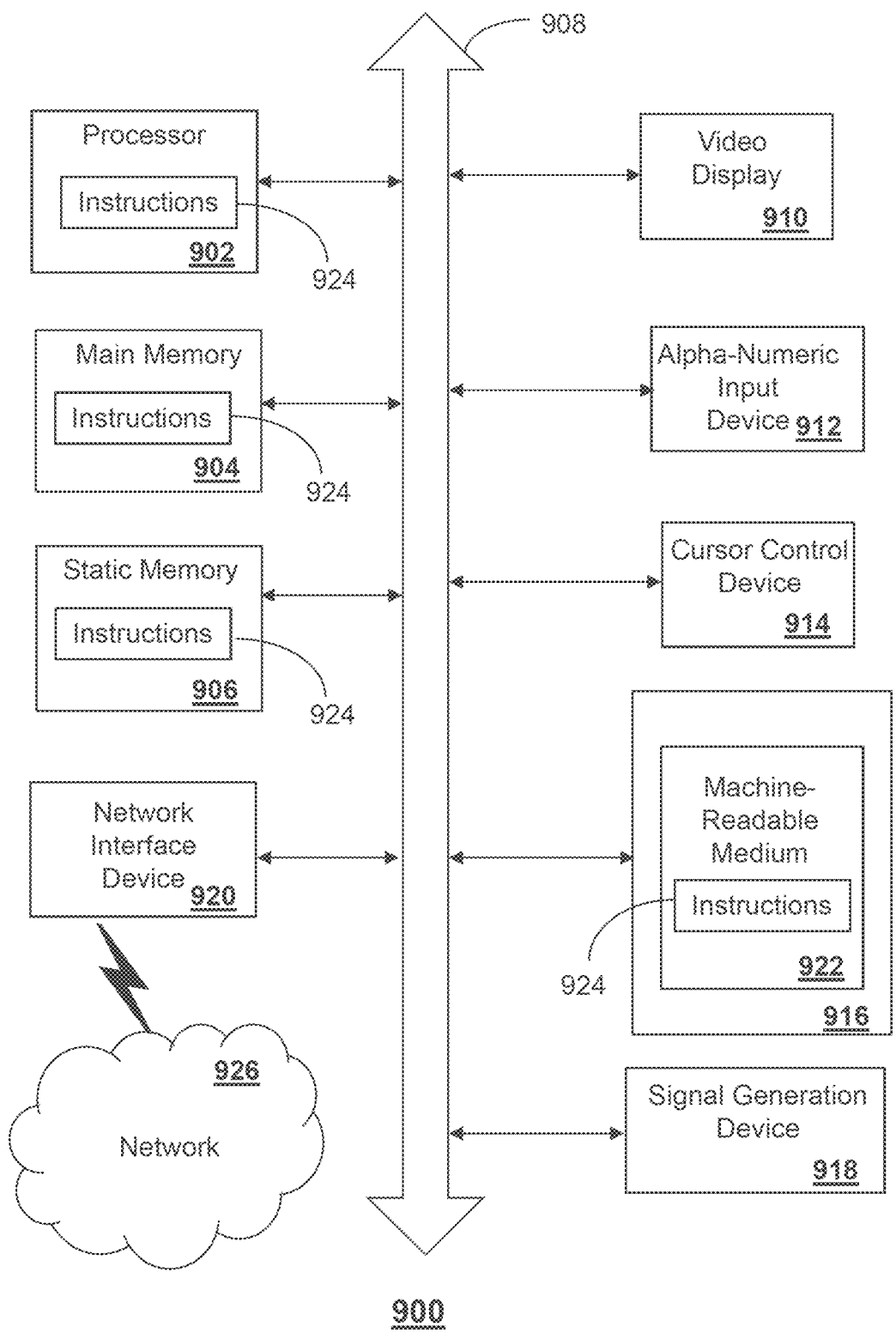
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as the controller 130, 508, 608, the video application server 510, and the video server 610 and other devices of FIGS. 1-6 and FIG. 8. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor, wherein the processing system corresponds to a network element of a cellular network that provides cellular services to a plurality of mobile devices; and
   a memory storing executable instructions that, when executed by the processing system, perform operations, comprising:
   receiving a request for a streaming application service from a mobile device included in the plurality of mobile devices; and
   responsive to a determination of a location of the mobile device relative to a wireless access point that corresponds to a service provider associated with the cellular network:
      initiating a communication session between the mobile device and the wireless access point without the mobile device engaging the wireless access point in a discovery and authorization process; and
      switching delivery of the streaming application service to the mobile device from over the cellular network to over the wireless access point.

2. The device of claim 1, wherein the determination involves determining an identity of the service provider of the wireless access point.

3. The device of claim 1, wherein the wireless access point is part of a Wi-Fi network.

4. The device of claim 1, wherein the determination involves determining that the mobile device is in a communication range of the wireless access point.

5. The device of claim 4, wherein a proximity of the wireless access point to the mobile device is determined according to a distance between a location of the wireless access point and the location of the mobile device not being greater than the communication range of the wireless access point.

6. The device of claim 1, wherein the switching of the delivery of the streaming application service to the mobile device involves causing a server to provide the streaming application service to the mobile device, according to an Internet-based address associated with the mobile device, by way of the wireless access point.

7. The device of claim 1, wherein the switching of the delivery of the streaming application service to the mobile device comprises sending a wireless packet-network address of the mobile device to a server to facilitate delivery of the streaming application service to the mobile device by way of the wireless access point.

8. The device of claim 1, wherein the operations further comprise confirming initiation of the communication session between the mobile device and the wireless access point, and wherein delivery of the streaming application service to the mobile device over the wireless access point is responsive to a confirmation of the initiation of the communication session.

9. The device of claim 1, wherein information regarding the location is provided by the mobile device.

10. The device of claim 9, wherein the information is obtained by the mobile device using data from a global positioning satellite.

11. The device of claim 1, wherein the location of the mobile device is determined by radio location.

12. The device of claim 11, wherein the radio location comprises triangulation.

13. A non-transitory, machine-readable storage device, comprising instructions which, responsive to being executed by a processor of a network element of a cellular network that provides cellular services to a plurality of mobile devices, cause the network element to perform operations comprising:
   obtaining, from a mobile device included in the plurality of mobile devices, a request for a high-bandwidth service to be provided over the cellular network; and
   responsive to determining an identity of a service provider of a wireless access point and responsive to a determination that the mobile device is in a communication range of the wireless access point:
      initiating a communication session between the mobile device and the wireless access point without the mobile device engaging the wireless access point in a discovery process, an authorization process, or both; and
      causing a server to provide the high-bandwidth service to the mobile device over the wireless access point.

14. The non-transitory, machine-readable storage device of claim 13, wherein the high-bandwidth service comprises a streaming application service.

15. The non-transitory, machine-readable storage device of claim 13, wherein the wireless access point is part of a Wi-Fi network.

16. The non-transitory, machine-readable storage device of claim 13, wherein information regarding a location of the mobile device is provided by the mobile device for the determination.

17. The non-transitory, machine-readable storage device of claim 16, wherein the location of the mobile device is obtained by radio location.

18. A method, comprising:
receiving, by a processing system comprising a processor of a network element of a cellular network, a request for an application service from a mobile device; and
responsive to determining an identity of a service provider of a wireless access point and responsive to a determination that the mobile device is in a communication range of the wireless access point:
  initiating, by the processing system, a communication session between the mobile device and the wireless access point without the mobile device engaging the wireless access point in an authorization process; and
  causing, by the processing system, a server to provide the application service over the wireless access point rather than over the cellular network.

19. The method of claim 18, wherein the request is directed to the cellular network.

20. The method of claim 18, wherein the application service comprises a high-bandwidth application service.

* * * * *